United States Patent
Green et al.

(10) Patent No.: US 9,463,516 B2
(45) Date of Patent: Oct. 11, 2016

(54) RETAINED ALIGNING ROTATING HACK SAW BLADE TENSIONING MECHANISM AND RELATED METHOD

(71) Applicant: IRWIN INDUSTRIAL TOOL COMPANY, Huntersville, NC (US)

(72) Inventors: Matthew C. Green, Amherst, MA (US); Christopher F. Fitzgerald, Belchertown, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 155 days.

(21) Appl. No.: 13/829,772

(22) Filed: Mar. 14, 2013

(65) Prior Publication Data

US 2014/0259703 A1    Sep. 18, 2014

(51) Int. Cl.
  *B27B 21/06*  (2006.01)
  *B23D 51/12*  (2006.01)

(52) U.S. Cl.
  CPC ........ *B23D 51/125* (2013.01); *Y10T 29/49817* (2015.01); *Y10T 29/49881* (2015.01)

(58) Field of Classification Search
  CPC .......... B23D 51/125; Y10T 29/49817; Y10T 29/49881
  USPC .......................................... 30/513, 506, 507
  See application file for complete search history.

(56) References Cited

U.S. PATENT DOCUMENTS

| | | | |
|---|---|---|---|
| 972,085 A | 10/1910 | Nacey | |
| 1,950,973 A | 3/1934 | Cross | |
| 2,048,627 A | 7/1936 | Schmidt et al. | |
| 2,204,390 A * | 6/1940 | Albright | 30/508 |
| 2,213,841 A * | 9/1940 | Hubeck | 30/513 |
| 2,514,880 A * | 7/1950 | Leatherman | 30/513 |
| 2,612,196 A | 9/1952 | Bouschor | |
| 2,691,396 A | 10/1954 | Harrison | |
| 2,703,121 A * | 3/1955 | Jolie | 30/513 |
| 2,715,426 A | 8/1955 | Morris | |
| 2,808,086 A * | 10/1957 | Dreier | 30/506 |
| 2,880,773 A | 4/1959 | Contreras et al. | |
| 2,959,203 A * | 11/1960 | Dreier | 30/513 |
| 3,173,461 A | 3/1965 | Johnson | |
| 3,329,186 A * | 7/1967 | David | 30/508 |
| 3,807,471 A | 4/1974 | Dreier | |
| 3,822,731 A | 7/1974 | Keymer | |
| 4,079,763 A * | 3/1978 | Riley | 30/508 |
| 5,261,922 A * | 11/1993 | Hood | 606/167 |
| 5,388,333 A * | 2/1995 | Chen | 30/508 |

(Continued)

*Primary Examiner* — Omar Flores Sanchez
(74) *Attorney, Agent, or Firm* — Sutherland Asbill & Brennan LLP

(57) ABSTRACT

A tensioning mechanism for a hack saw blade extends through a pin holder mounting slot of a hack saw frame and applies tension to a hack saw blade attached thereto. The tensioning mechanism includes a first portion having a configuration that, with respect to a configuration of the slot, permits rotation of the tensioning mechanism when the first portion extends through the mounting slot. The tensioning mechanism also includes a second portion having a configuration that, with respect to the configuration of the slot, engages into the slot only in select rotational orientations thereof relative to the slot, wherein one of said orientations is angularly separated from another orientation by a substantially set rotational angle of the second portion. The tensioning mechanism further includes first and second mechanisms configured to prevent removal of the tensioning mechanism from the mounting slot once extended therethrough.

22 Claims, 5 Drawing Sheets

(56) References Cited

U.S. PATENT DOCUMENTS

| | | | |
|---|---|---|---|
| 5,442,857 A * | 8/1995 | Gugel | 30/392 |
| 5,768,788 A * | 6/1998 | Arnold | 30/513 |
| 5,870,829 A * | 2/1999 | Gugel et al. | 30/392 |
| 6,098,294 A * | 8/2000 | Lemos | 30/513 |
| 6,216,350 B1 | 4/2001 | Kirk | |
| 6,606,795 B2 * | 8/2003 | Erisoty et al. | 30/512 |
| 6,742,268 B2 | 6/2004 | Chen | |
| 6,772,522 B1 * | 8/2004 | Huang et al. | 30/513 |
| 8,613,146 B2 * | 12/2013 | Ebner | 30/507 |
| 8,763,260 B2 * | 7/2014 | Ranieri et al. | 30/512 |
| 2003/0196339 A1 * | 10/2003 | Snider | 30/513 |
| 2003/0229995 A1 * | 12/2003 | Huang | 30/513 |
| 2004/0020062 A1 * | 2/2004 | Ducret | 30/512 |
| 2007/0028465 A1 * | 2/2007 | Chen | 30/506 |
| 2007/0131075 A1 * | 6/2007 | Zhang et al. | 83/699.21 |
| 2009/0113729 A1 | 5/2009 | Chen | |
| 2010/0192392 A1 * | 8/2010 | Scott et al. | 30/513 |
| 2013/0205605 A1 * | 8/2013 | Huang | 30/501 |
| 2013/0283540 A1 * | 10/2013 | McDonough et al. | 7/144 |
| 2014/0259703 A1 * | 9/2014 | Green et al. | 30/513 |

* cited by examiner

RETAINED ALIGNING ROTATING HACK SAW BLADE TENSIONING MECHANISM AND RELATED METHOD

FIELD OF THE INVENTION

The present invention relates to hack saw blade tensioning mechanisms and, more particularly, to hack saw blade tensioning mechanisms adapted to rotate and align a hack saw blade without separating from the hack saw frame.

BACKGROUND OF THE INVENTION

Conventional hack saw frames generally have a proximal handle (closer to a user's hand), a distal portion (farther from a user's hand, relative to the proximal handle), and an elongate upper frame arm extending between the upper ends of proximal handle and distal portion. The hack saw defines a generally planar shape. Each handle defines a mounting slot/cavity adjacent a lower end thereof, through which projects a blade mounting pin holder, for releasably mounting a hack saw blade therebetween. Generally, at least one of the blade mounting pin holders also operates as a blade tensioning mechanism, through which tension is applied to the blade, to keep the blade rigid to assist in straighter cuts and longer blade life.

In use, a user manually applies push and pull strokes to the hack saw, in a plane of motion, to cut through a work piece. Usually, the cut is aligned with the plane of motion. On occasion, a cut must be made that is not aligned with the plane of motion. For example, space constraints or interference may prevent proper orientation or movement of the saw. As another example, a work piece surface may have an object protruding therefrom that requires removal, such as a work piece surface having a pipe projecting therefrom that requires cutting at the base thereof, i.e., at the interface between the pipe and the work piece surface. In such a case, the hack saw cannot be oriented to cut through the object, e.g., transversely through it, due to interference between the hack saw and the work piece. To make the cut, the user must orient the height of the blade in a plane substantially parallel to the plane of the work piece surface, i.e., in a plane perpendicular, or at some other angle, to the plane of motion. The blade may then be placed substantially flush with, and adjacent to, the work piece surface and cut through the base of the projecting pipe. Normally, however, a blade is mounted in a hack saw frame, such that the height thereof orients in a plane parallel to the plane defined by the saw and the plane of motion (and perpendicular to the work piece surface). Thus, for example, the blade must be rotated, e.g., approximately 90°, to be oriented substantially parallel to the work piece surface. To mount the blade to the frame in this rotated orientation, the tensioning mechanism and the blade mounting pin holder, to which the blade is secured, must also be rotated.

In some saws, the tensioning mechanism is not rotatable within the mounting slot through which it projects. For example, the tensioning mechanism and mounting slot are cooperatively shaped, e.g., keyed, so that it cannot rotate in the slot. One reason for this is to ensure that the tensioning mechanism does not rotate and thereby misalign the blade secured thereto during use of the hack saw. Thus, to rotate the blade, the tensioning mechanism is separated from the hack saw frame (i.e., from the respective slot to which it is assembled), independently rotated, and then reassembled to the hack saw frame. At a minimum, such separation, to rotate the tensioning mechanism is a nuisance to the user as it renders the process more difficult and/or time consuming.

In other saws, the tensioning mechanism is freely rotatable within the mounting slot of the handle through which the tensioning mechanism projects. Thus, the tensioning mechanism can rotate within the mounting slot without separating therefrom. However, as mentioned above, one drawback associated with this approach is a potential problem with respect to maintaining proper alignment of the tensioning mechanism, and thus the blade. A freely rotatable tensioning mechanism is also susceptible to misalignment during assembly. For example, the tensioning mechanism may be initially assembled to the mounting slot in an incorrect orientation. Even if initially assembled oriented properly, the tensioning mechanism is susceptible to rotating/twisting while applying tension thereto, thereby misaligning the tensioning mechanism. Such misalignment will result in misalignment of the hack saw blade secured thereto.

SUMMARY OF THE INVENTION

It is an object of the present invention to overcome one or more of the above-described drawbacks and/or disadvantages of the known tensioning mechanisms for a hack saw blade.

In accordance with a first aspect, a device comprises a tensioning mechanism for a hack saw blade, configured to be extendable through a pin holder mounting slot of a hack saw frame and adapted to apply tension to a hack saw blade attached thereto. The tensioning mechanism includes a first portion having a configuration that, with respect to a configuration of the slot, permits rotation of the tensioning mechanism when the first portion extends through said mounting slot, a second portion having a configuration that, with respect to the configuration of the slot, engages into the slot only in select rotational orientations thereof relative to the slot, wherein one of said orientations is angularly separated from another orientation by a substantially set rotational angle of the second portion; a first mechanism configured to prevent removal of the tensioning mechanism from the mounting slot in a distal direction; and a second mechanism configured to prevent removal of the tensioning mechanism from the mounting slot in a proximal direction. The tensioning mechanism is slidable within the mounting slot between a first position wherein the first portion is located in the mounting slot and the second portion is not located in the mounting slot, thereby permitting said rotation of the tensioning mechanism, and a second position wherein at least a portion of the second portion is located in the mounting slot.

In some embodiments, the first mechanism comprises a mounting pin projecting from the tensioning mechanism, configured to interfere with a portion of the hack saw frame surrounding the mounting slot. In some such embodiments, the first mechanism defines a dimension thereof that is greater than a largest dimension of the mounting slot.

In some embodiments, the tensioning mechanism further comprises a threaded portion, and the second mechanism is a tensioning fastener threaded thereon. In some such embodiments, the threaded portion defines an annular thread-interrupting channel and a thread-interrupting member mounted therein for substantially preventing the tensioning fastener from separating from the threaded portion. In some such embodiments, the thread-interrupting member is a snap ring. In yet some such embodiments, the tensioning fastener includes a fastening nut.

In some embodiments, the tensioning mechanism includes first, second, third and fourth elongate and adjacent sections. The first section comprises the first mechanism and defines a proximal end of the tensioning mechanism. The second section comprises the first portion. The third section comprises the second portion, and the fourth section comprises the second mechanism and defines a distal end of the tensioning mechanism.

In some embodiments, the first portion is shaped and dimensioned, with respect to the shape and dimensions of the mounting slot, to permit rotation of the tensioning mechanism when the first portion extends through the mounting slot. In some embodiments, a largest dimension of the first portion transversely to a direction of movement of the tensioning mechanism between the first and second positions is smaller than a smallest dimension of the slot transversely to said direction. In some embodiments, the second portion is shaped and dimensioned, with respect to the shape and dimensions of the mounting slot, to engage into the mounting slot only in the select rotational orientations thereof relative to the slot.

In some embodiments, at least one of the select rotational orientations is angularly separated from an adjacent select rotational orientation by an approximately 90 degree rotational angle of the second portion.

In some embodiments, the second portion is shaped and dimensioned, relative to the shape and dimensions of the mounting slot, to create an interference with a portion of the hack saw frame surrounding the slot when not oriented in one of the select rotational orientations relative to the slot, thereby preventing engagement of the second portion into the slot. In some embodiments, the second portion is shaped and dimensioned, relative to the shape and dimensions of the mounting slot, to substantially prevent rotation of the tensioning mechanism when the second portion is engaged in the mounting slot. In some embodiments, the first portion is substantially cylindrical and the second portion is substantially rectangular.

In some embodiments, the device further comprises a hack saw frame having an elongate upper frame arm, a proximal handle, and a distal portion, wherein one of the proximal handle and distal portion defines the pin holder mounting slot and the other of proximal and distal portions define a second pin holder mounting slot. In some such embodiments, the tensioning mechanism is extendable through at least one of the pin holder mounting slot and the second pin holder mounting slot. In some such embodiments, the device further comprises a hack saw blade mounted to the hack saw frame.

In accordance with another aspect, a device comprises a tensioning mechanism for a hack saw blade configured to be extendable through a pin holder mounting slot of a hack saw frame and adapted to apply tension to a hack saw blade attached thereto. The tensioning mechanism includes first means for permitting rotation of the tensioning mechanism when the first means extends through said mounting slot; second means for orienting the tensioning mechanism within the mounting slot only in a plurality of select rotational orientations; third means for preventing removal of the tensioning mechanism from the mounting slot in a distal direction; and fourth means for preventing removal of the tensioning mechanism from the mounting slot in a proximal direction. The tensioning mechanism is slidable within the mounting slot between a first position wherein the first means is located in the mounting slot and the second means is not located in the mounting slot, thereby permitting said rotation of the tensioning mechanism, and a second position wherein at least a portion of the second means is located in the mounting slot.

In some embodiments, the first means is a first portion of the tensioning mechanism, shaped and dimensioned, with respect to the shape and dimensions of the mounting slot, to permit rotation of the tensioning mechanism when the first portion extends through the mounting slot. The second means is a second portion of the tensioning mechanism, shaped and dimensioned, with respect to the shape and dimensions of the mounting slot, to engage into the mounting slot only in select rotational orientations thereof relative to the slot, wherein one of said orientations is angularly separated from another orientation by a substantially set rotational angle of the second portion. The third means is a mounting pin projecting from the tensioning mechanism configured to interfere with a portion of the hack saw frame surrounding the mounting slot. The fourth means is a tensioning fastener mounted on the tensioning mechanism and configured to interfere with a portion of the hack saw frame surrounding the mounting slot.

In accordance with another aspect, a method comprises the steps of engaging a tensioning mechanism for a hack saw blade with a hack saw frame and threading a tensioning fastener onto the threaded portion of the tensioning mechanism. The hack saw frame comprises an elongate upper frame arm, a proximal handle and a distal portion, and the proximal handle and distal portion define respective proximal and distal mounting slots. The tensioning mechanism comprises a first portion having a configuration that, with respect to a configuration of one of proximal and distal slots, permits rotation of the tensioning mechanism when the first portion extends through the one of the proximal and distal slots, a second portion having a configuration that, with respect to the configuration of the one of the proximal and distal slots, engages into the one of the proximal and distal slots only in select rotational orientations thereof relative to the slot, wherein one of said orientations is angularly separated from another orientation by a substantially set rotational angle of the second portion, a blade mounting pin adjacent a first end of the tensioning mechanism and sufficiently projecting from the tensioning mechanism to prevent removal of the tensioning mechanism from the one of the proximal and distal slots in a direction such that the mounting pin end is trailing, and a threaded portion on a second end of the tensioning mechanism opposite from the first end relative to the first and second portions. The engaging step comprises inserting the tensioning mechanism through one of the proximal and distal mounting slots with an end of the tensioning mechanism opposite the mounting pin end.

In some embodiments, the method further comprises the steps of sliding the tensioning mechanism within the slot into a first position wherein the first portion is located in the mounting slot and the second portion is not located in the mounting slot, rotating the tensioning mechanism to a first desired select rotational orientation, sliding the tensioning mechanism within the slot into a second position wherein at least a portion of the second portion is located in the mounting slot, and securing one end of a hack saw blade to the tensioning mechanism.

In some such embodiments, the method further comprises the steps of engaging a blade mounting pin holder into the other of the proximal and distal mounting slot, securing the other end of the hack saw blade to the pin holder; and applying tension to the hack saw blade by further threading the tensioning fastener onto the threaded portion.

In some such embodiments, the method further comprises the steps of releasing the tension applied to the hack saw blade by at least partially unthreading the tensioning fastener, removing at least one end of the hack saw blade from the hack saw, sliding the tensioning mechanism within the slot into the first position, rotating the tensioning mechanism to a second desired select rotational orientation, sliding the tensioning mechanism within the slot into the second position without separating the tensioning mechanism from the slot, reattaching the at least one end of the hack saw blade to the hack saw, and re-applying tension to the hack saw blade by re-threading the tensioning fastener onto the threaded portion.

Objects and advantages of the present invention, and/or of the currently preferred embodiments thereof, will become more readily apparent in view of the following detailed description of the currently preferred embodiments and accompanying drawings.

DETAILED DESCRIPTION OF EMBODIMENTS OF THE INVENTION

Figure 1:
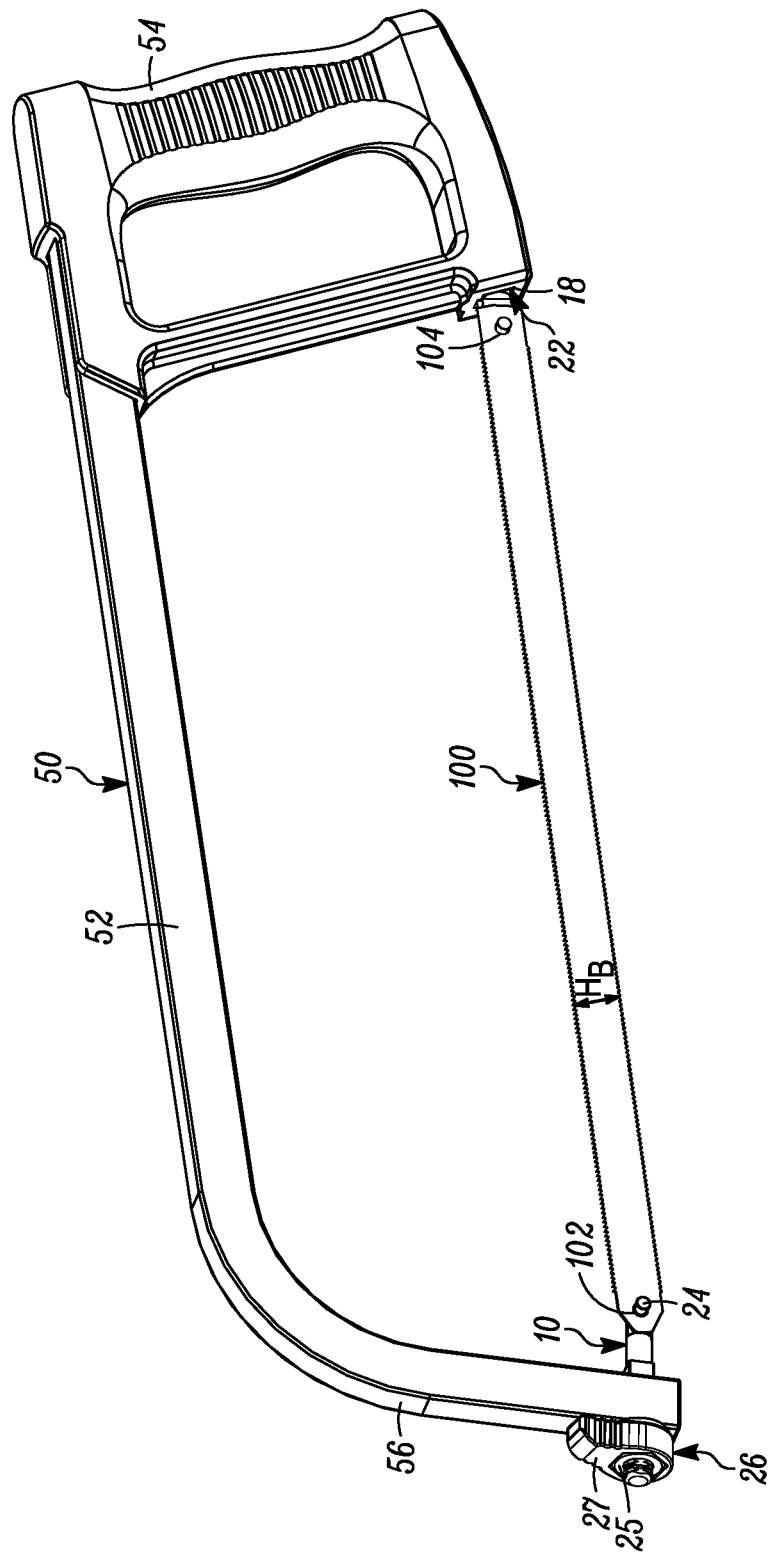
FIG. 1 is a perspective side view of a hack saw blade tensioning mechanism mounted to a hack saw frame and a hack saw blade secured to the frame such that the height of the blade orients in a plane parallel to the plane of motion.

In FIGS. 1-5, a hack saw blade tensioning mechanism is indicated generally by the reference numeral 10. The tensioning mechanism 10 is connectable to, and utilized with, a hack saw frame 50 to mount an elongate hack saw blade 100 thereto, to apply the necessary tension to the blade 100.

A hack saw frame 50 is defined by an elongate upper frame arm 52, a proximal handle 54 extending downwardly from a proximal end of the frame arm 52, and a distal portion 56 extending downwardly from a distal end of the frame arm 52. Some such exemplary hack saw frames 50 are disclosed in U.S. patent application Ser. No. 12/626,377, filed on Nov. 25, 2009, entitled "Hacksaw with Blade Tensioning Mechanisms," which, in turn, claims the benefit of similarly titled U.S. Provisional Patent Application Ser. No. 61/118,573, filed Nov. 28, 2008, and U.S. patent application Ser. No. 13/828,369, filed on Mar. 14, 2013, entitled "Hack Saw with Integrated Retainer for Blade Pin Holder and Related Method," each of which is hereby expressly incorporated by reference in its entirety as part of the present disclosure.

The proximal handle 54 and distal portion 56 define, adjacent respective lower ends thereof, respective proximal and distal mounting slots 18, 20. The slots 18, 20 are substantially aligned with one another in the same plane in order to mount an elongated blade 100 therebetween in a straight, leveled, manner. One of the slots 20, is sized and shaped to receive the tensioning mechanism 10 therethrough. The other of the slots 18 is sized and shaped to receive a blade mounting pin holder 22 therethrough. A blade 100 is secured, at opposing ends thereof, to the hack saw frame 50 via the tensioning mechanism 10 and the mounting pin holder 22. In the illustrated embodiment, the tensioning mechanism 10 is connected to, i.e. extends through, the distal mounting slot 20. However, as should be appreciated by those of ordinary skill in the pertinent art, the tensioning mechanism 10 or a second tensioning mechanism may equally be connected to the proximal mounting slot 18 instead.

Figure 2:
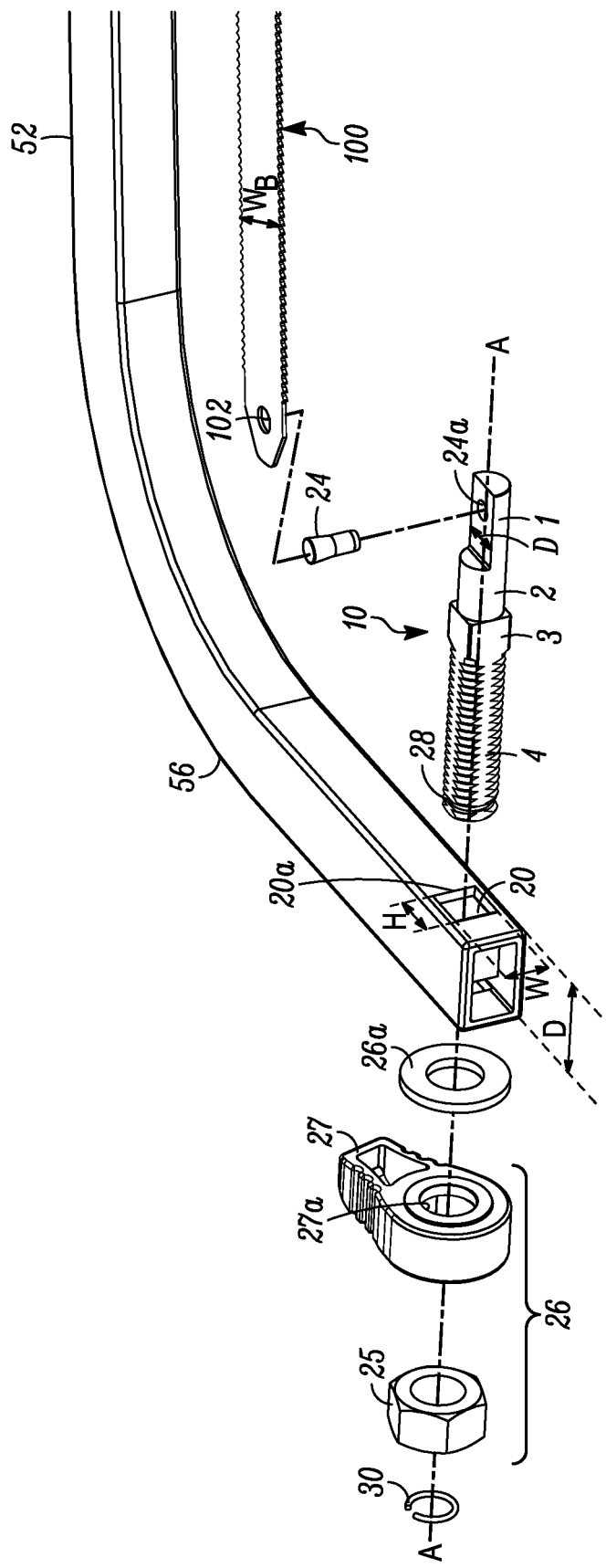
FIG. 2 is a perspective side view of the distal portion of the hack saw blade of FIG. 1 and an exploded view of the tensioning mechanism.

The blade tensioning mechanism 10 is dimensioned, e.g., length, in combination with the dimensions, e.g., length, of the frame 50 and the blade 100, in order to allow the tensioning mechanism to be places in a tensioning position, i.e., a position applying sufficient tension to the blade 100 secured thereto, while extending through the distal slot 20. As shown in FIG. 2 the tensioning mechanism 10 includes four integrally adjacent sections. An axis A extends therethrough. The first section 1, defining a first end of the tensioning mechanism 10, is generally defined by an elongate portion having a blade mounting pin 24 extending therefrom. The mounting pin 24 releasably engages a corresponding mounting aperture 102 of the blade 100. In the illustrated embodiment, though shown in an exploded view, the mounting pin 24 is securely retained in a pin hole 24a in the first section 1, e.g., by a press fit, welding, brazing, etc. In other embodiments, the mounting pin 24 is integrally formed with the first section 1, e.g., machined from the blank from which the tensioning mechanism 10 is formed. The pin 24 projects a projection length L from the surface of section 1. The projection length L of the pin 24 is sized so that section 1 has a dimension X, transverse to the slot 20, that is greater than the largest dimension of the slot 20, thereby creating an interference between section 1 and the slot 20. Thus the tensioning mechanism 10 cannot be distally removed from the slot 20 because section 1 is too large to pass through it. As should be understood by those of ordinary skill in the pertinent art, however, other dimensions other than the projection length L of the mounting pin 24 may be used to create an interference with the slot 20, such as, for example, the width or diameter of the pin 24 or the first section 1.

Figure 3:
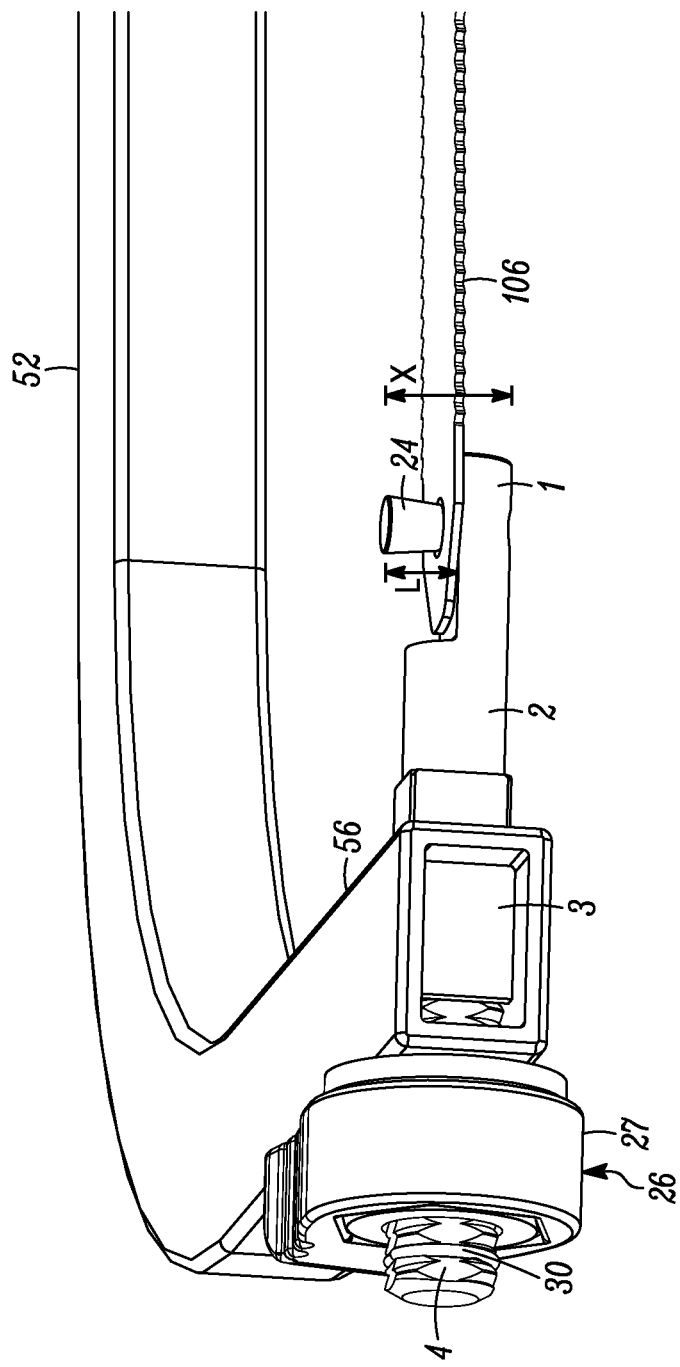
FIG. 3 is a perspective bottom view of the distal portion of the hack saw frame of FIG. 1 with the tensioning mechanism mounted therein.
Figure 4:
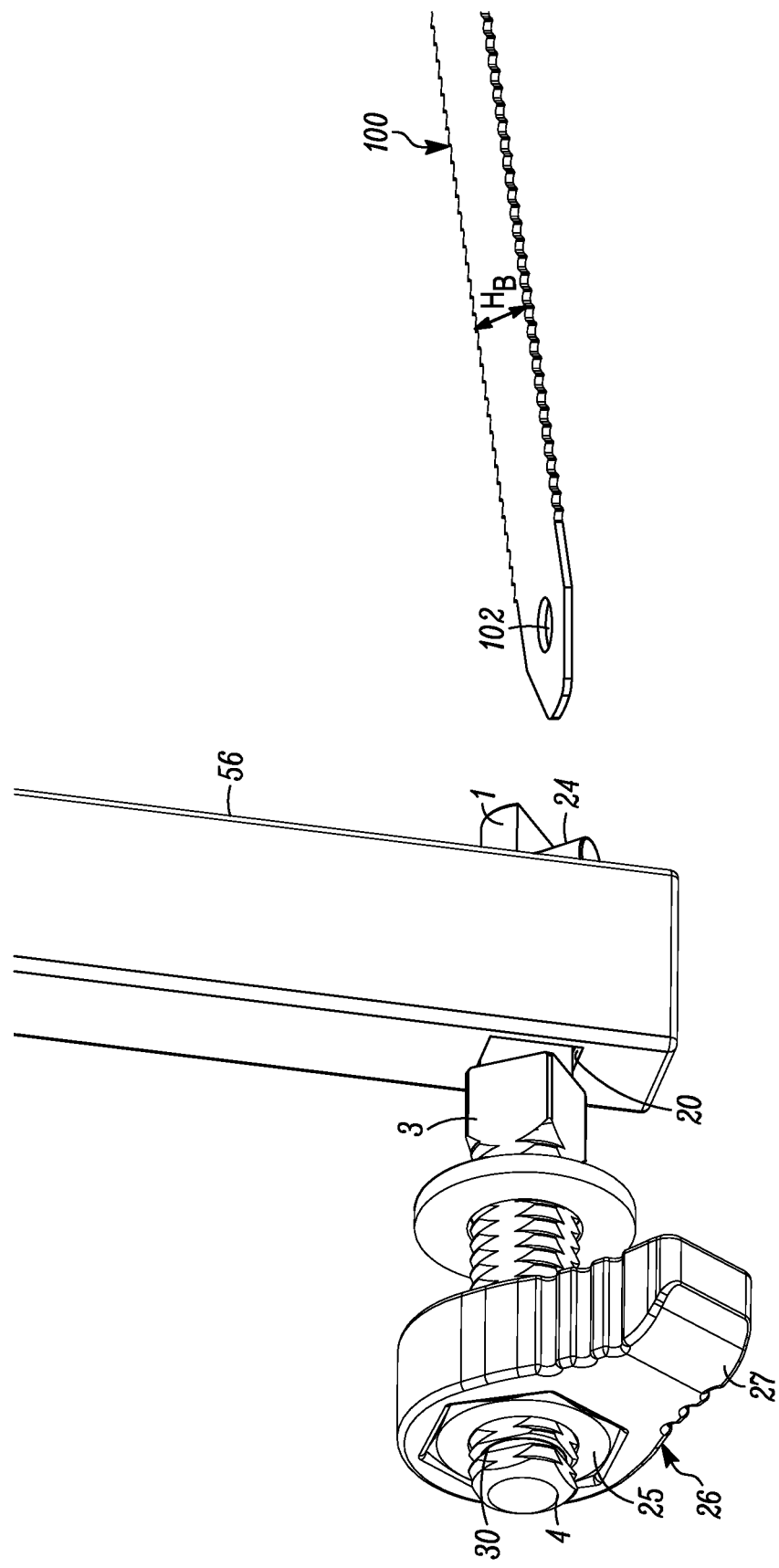
FIG. 4 is a perspective side view of the tensioning mechanism of FIG. 1 in a misaligned position with the mounting slot of a hack saw frame, and thus not extendable through the mounting slot.

The fourth section 4 of tensioning mechanism 10, defining the opposing second end thereof, is defined by an elongate and substantially threaded portion. After assembly to the distal slot 20, a tensioning member/fastener 26 is threaded thereon, for applying tension to a blade 100, and for creating an interference with the slot 20, as will be described further below. The threaded fourth section defines a length that allows the tensioning member 26 to thread thereon as needed to apply sufficient tension to the blade 100. In the illustrated embodiment, the tensioning member 26 includes a fastening nut 25 and a nut holder 27 assisting in rotating the nut 25 on the threaded portion 4. As seen in FIGS. 3 and 4, the nut is 25 non-rotatably held within the nut holder 27. The nut holder 27 defines an internal cavity 27a in which the nut 26 is received that is shaped to engage the outside contour of the nut 25 and thus rotate the nut 25 when the nut holder 27 is rotated. In the illustrated embodiment, a washer 26a is located between the tensioning member 26 and the distal portion 56. As should be recognized by those of ordinary skill in the pertinent art, the tensioning member 26 may take the form of any member(s), currently known or that later becomes known, capable of performing the functions of the tensioning member 26 as described herein.

As shown best in FIG. 3, the fourth section 4 includes a non-threaded annular channel or groove 28 adjacent the end thereof (which defines the second end of the tensioning mechanism 10). The channel 28 is dimensioned to receive a retaining member 30 therein for interfering with or preventing unthreading of the nut 25 off of the fourth section 4. For example, in the illustrated embodiment, the annular channel 28 receives a snap ring therein. When the snap ring 30 is assembled/snapped into the channel 28, it substantially prevents the nut 25 from completely unthreading off of the fourth section 4, as it cannot unthread past the snap ring 30. The nut 25 is also larger than the mounting slot 20, and therefore once the nut 25 is threaded onto the fourth section 4, the tensioning mechanism 10 is also prevented from separating from the slot 20 via the fourth section 4, i.e., by moving proximally through the slot 20. As should be appreciated by those of ordinary skill in the pertinent art, any member, currently known or that later becomes known, capable of interfering with or preventing unthreading of the nut 25 off of the fourth section 4 may be assembled into the annular channel 28. Other embodiments have different devices for preventing complete unthreading of the nut 25. For example, a pin can be attached to the fourth section, either permanently or removably, that prevents the tensioning mechanism from being removed through the slot 20. Alternatively, the fourth section 4 may be sufficiently long to substantially mitigate unthreading of the nut 25 off of the tensioning member, without including an annular channel 28 and/or a retaining member 30.

The second and third sections 2, 3, are located in the middle of the tensioning mechanism 10, between the first and fourth end sections 1, 4. The second section 2, located between the first and third sections 1, 3, is shaped and dimensioned (relative to the shape and dimensions of the mounting slot 20) such that it can freely extend through, and rotate about the axis A, within the distal slot 20. To achieve this, the largest cross-sectional dimension of the second section 2, in a plane parallel to the face 20a of the slot 20, is smaller than the smallest dimension of the slot 20 in the same plane. For example, in the illustrated embodiment, the distal slot 20 is rectangular, defining a cross-sectional height H and a width W. The second section 2 is cylindrical, defining a cross-sectional diameter D. The diameter D of the second section 2 is smaller than the smaller of the height H and width W of the slot 20. Thus, in the illustrated embodiment, the second section 2 can both freely extend through, and freely rotate about the axis A within, the slot 20. As should be understood by those of ordinary skill in the pertinent art, the length of the second section 2, or the combined length of the second section 2 and the length of any portion of adjacent first section 1 insertable within the slot 20, e.g., the portion between the pin 24 and the second section 2, defines a length at least as long as a length P of the slot 20. Accordingly, the second section 2 and any such portion of the first section 1 can extend completely through the slot 20 to, in turn, allow rotation of the tensioning mechanism about the axis A.

The third section 3 of the tensioning mechanism 10 is located between the second and the fourth sections 2, 4 thereof. The third section 3 is shaped and dimensioned (relative to the shape and dimensions of the distal slot 20) to be capable of extending through the distal slot 20 only when aligned therewith. The third section 3 aligns with the slot 20 only in certain select orientations, where one select orientation is angularly separated from another select orientation by rotating the tensioning mechanism 10, e.g., about the axis A, by a substantially set angular increment (rotational angle). The aligned orientations of the third section 3, and therefore of the tensioning mechanism 10, correspond to proper alignment of a blade 100 secured thereto. If the third section 3 is not aligned with the slot 20, the slot 20 creates an interference with the third section 3, thereby preventing extension of the third section 3 through the slots 20.

Figure 5:
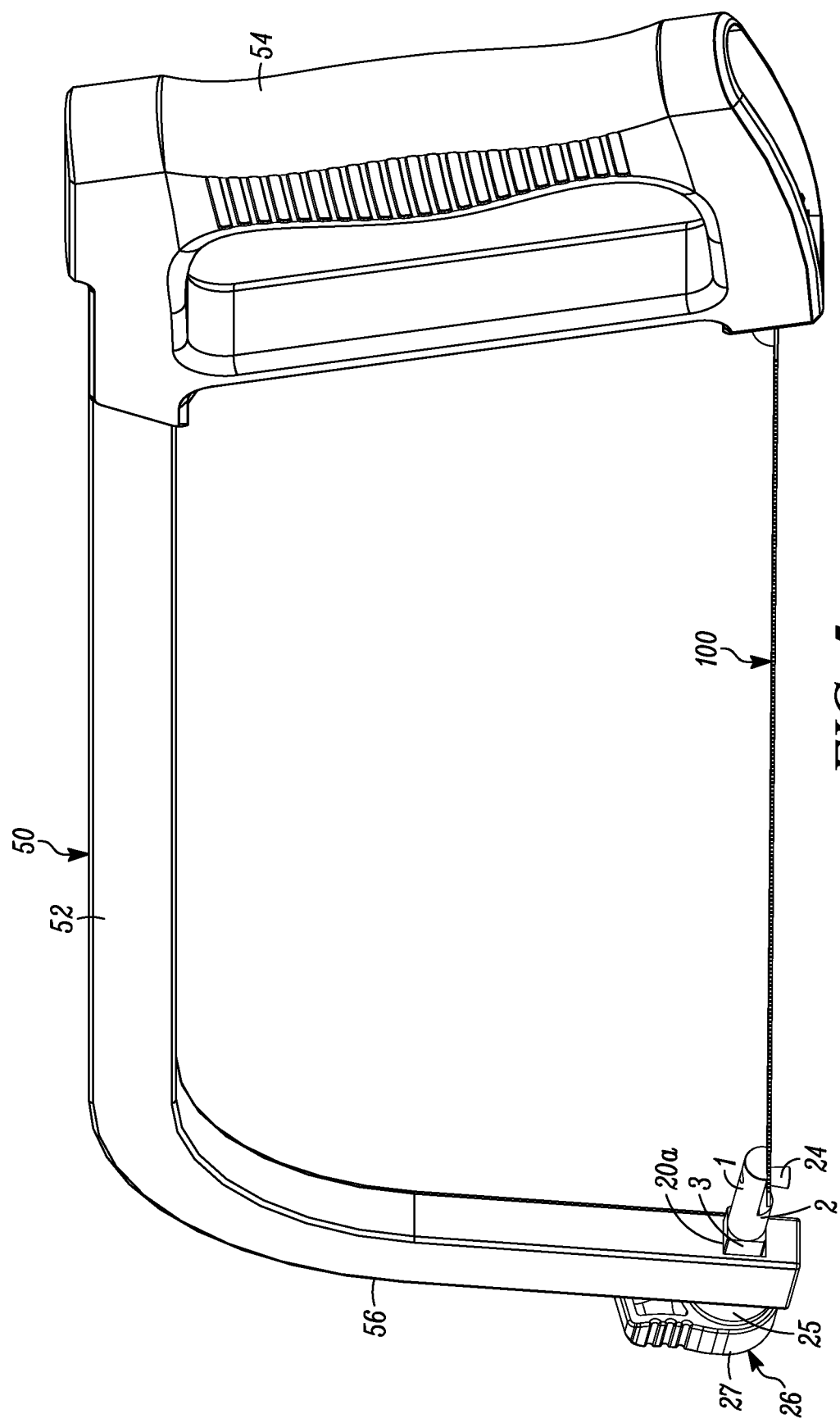
FIG. 5 is a perspective side view of the mounted tensioning mechanism of FIG. 1, rotated 90° from its position in FIG. 1, such that the height of the hack saw blade secured thereto orients in a plane perpendicular to the plane of motion.

For example, in the illustrated embodiment, the third section 3, like the distal slot 20, defines a substantially rectangular cross-section in a plane parallel to the face 20a of the distal slot 20. The third section 3 is dimensioned such that it aligns with the distal slot 20 in approximately 90° increments from a previous aligned orientation. That is, in a first aligned position, such as shown in FIG. 2, the third section 3 can extend through the slot 20, as shown in FIG. 3. If the third section is disengaged from the slot 20 and rotated approximately 90° about axis A, as shown in FIG. 5, the third section 3 realigns with the slot 20 and can re-extend therethrough. If, however, the tensioning mechanism 10 is not rotated in increments of 90° about axis A, such as 45° for example, the third section 3 will not align with the rectangular slot 20, but rather create an interference therewith (shown best in FIG. 4). Thus, in the illustrated embodiment, the third section 3 of the tensioning mechanism 10 cannot align with, and be inserted into, the slot 20 when not rotated in increments of approximately 90° from an initial aligned orientation.

As should be recognized by those of ordinary skill in the pertinent art based on the teachings herein, however, the second and third sections 2, 3 of the tensioning mechanism 10, along with the distal slot 20, may define any of numerous different respective shapes and dimensions configured to allow the second and third sections 2, 3 to cooperate with the slot 20 in the same manner above-described. That is, the second section 2 can be any shape and size as long as it is shaped and dimensioned relative to the shape and dimension of the slot 20 to freely extend and rotate about axis A within the slot 20. The third section 3 is shaped and dimensioned relative to the shape and dimension of the slot 20 to only engage and extend through the slot 20 in certain aligned orientations, corresponding to proper alignment of a hack saw blade 100 secured thereto, achieved by rotating the tensioning mechanism 10 about the axis A by a substantially set angle from a previous aligned orientation. For example, an octagonal shape will permit the tensioning mechanism 10 and therefore the blade 100 to be oriented at approximately 45° increments. The third section 3 is also shaped and dimensioned to substantially prevent rotation of the tensioning mechanism 10 about the axis A when the third section 3 is extending through the slot 20, so as to substantially prevent twisting or misalignment of the blade 100 secured thereto.

A hack saw blade 100 is mounted in the hack saw frame 50 via the tensioning mechanism 10 and the pin holder 22. The tensioning mechanism 10 and the pin holder 22 are first engaged with the frame 50, and then the blade 100 is mounted thereto. Tension is applied to the blade 100 thereafter via the tensioning mechanism 10. To assemble the tensioning mechanism 10 to the frame 50, the tensioning mechanism 10 is extended through the distal slot 20 from a proximal face 20a thereof through the distal face thereof with the threaded fourth section 4 leading. The tensioning mechanism 10 is passed through the slot 20 without the thread-interrupting member 30 or the nut 25 mounted thereon. The tensioning mechanism 10 is rotated about axis A to properly align the third section 3 with the distal slot 20, as explained above, such that after the fourth section 4 passes through the slot 20, the third section 3 can also pass therethrough. Once the tensioning mechanism 10 is extended through the distal slot 20, such that the first and fourth sections 1, 4 are located on opposite sides of the slot, the nut 25 is threaded onto the threaded fourth section 4 and the thread-interrupting member 30 is mounted into the annular channel 28 thereof. Thus, at one end of the tensioning mechanism 10, the nut 25 creates an interference with the distal slot 20. As the nut normally cannot unthread past the member 30, the nut 25 can no longer be removed from the fourth section 4 of the tensioning member 10 without removing the retaining member 30 and then the nut 25. At the opposing end of the tensioning member 10, the mounting pin 24 also creates an interference with the distal slot 20. Thus, the assembled tensioning mechanism 10 cannot inadvertently separated from the distal portion 56.

After the tensioning mechanism 10 is assembled to the distal portion 56, the hack saw blade 100 can be mounted onto the mounting pin 24 thereof via the mounting aperture 102. To ensure mounting of the blade 100 in a properly aligned orientation, the third section 3 must extend through the slot 20. Thus, without disassembling the mechanism 10 from the distal portion 56, the second section 2 of the tensioning mechanism 10 is slid into the distal slot 20, such that the third section is out of the slot 20, and rotated about axis A until the third section 3 is aligned with the slot 20. Alternatively, if the fourth section 4 is long enough and the tensioning member 26 can be unthreaded enough to permit the fourth section 4 to be moved sufficiently proximally to extend through the slot 20 (i.e., the third section 3 can be moved proximally completely out of the slot 20), the fourth section 4 can be slid into the distal slot 20 and rotated until the third section 3 is aligned with the slot 20. Once the third section 3 is aligned, it may be reinserted through the distal slot 20 and ensure proper alignment of the blade 100 once mounted onto the mounting pin 24. The blade 100 is also mounted, via a mounting aperture 104 adjacent an opposing end thereof, to the proximal handle 54 via the pin holder 22. The blade 100 is secured to the hack saw frame 50 once tension is applied thereto. In the illustrated embodiment, the nut 25 threaded onto the fourth section 4 of the tensioning mechanism 10 can be tightened, via rotation, to effect movement of the tensioning mechanism 10 in a distal direction to apply tension to the blade 100. The hack saw is ready for use thereafter.

In use, a user manually grasps the proximal handle 54 of the hack saw frame 50 and applies, in a plane of motion, push and pull strokes to the hack saw to cut through a work piece. Typically, the blade 100 is mounted in the hack saw frame 50, such that the height $H_B$ orients in a plane parallel to the plane of motion, as shown in FIG. 1. If, however, the user cannot operate the saw to make the desired cut with the blade so mounted, e.g., encounters an object protruding from the work piece surface, the blade 100 can be rotated, e.g., parallel to the surface of the work piece. The hack saw blade 100 can be rotated such that the height $H_B$ thereof orients in a plane suitable for cutting, e.g., substantially perpendicular to the plane of motion, as shown in FIG. 5.

For example, the blade 100 as shown in FIG. 1 can be rotated substantially 90° to be oriented in a plane substantially parallel to the plane of a substantially flat and level work piece surface. As mentioned above with respect to the illustrated embodiment, the third section 3 is shaped and dimensioned such that it can align with the distal slot in approximately 90° rotational increments about the axis A from an original aligned orientation. The nut 25 on the threaded fourth section 4 of the tensioning mechanism 10 is loosened to release the tension applied to the blade 100 and, in turn, to remove the blade 100 from the tensioning mechanism 10 and/or the pin holder 22. The fourth section 4 defines sufficient axial extent such that the nut 25 may be sufficiently loosened without reaching the annular channel 28 and thread-interrupting member 30. Without disassembling the mechanism 10 from the distal slot 20, the tensioning mechanism 10 is moved distally such that the third section 3 exits the distal slot 20 in the distal direction and the second section 2 enters therein. The mechanism 10 is then rotated substantially 90° about the axis A, allowing the third section 3 to be realigned with, and re-inserted through, the slot 20. The third section 3 is then moved proximally back into the slot 20.

The proximal pin holder 22 is similarly rotated so as to hold the proximal end of the blade 100 in the same orientation as the distal end. In some embodiments, the proximal pin holder 22 cooperates with the proximal handle 54 such that the pin holder 22 may be moved out of a substantially non-rotating engagement with the proximal mounting slot 18, rotated as necessary, and then moved distally back into a substantially non-rotating engagement with the slot 18. In some embodiments, the proximal pin holder 22 may be configured, and cooperates with the proximal handle 54, as disclosed in U.S. patent application Ser. No. 13/828,369, entitled "Hack Saw with Integrated Retainer for Blade Pin Holder and Related Method," incorporated by reference above. In other embodiments, the proximal pin holder 22 may be configured similarly to the tensioning mechanism 10 and cooperates with the proximal mounting slot in a similar manner. In yet other embodiments, the proximal pin holder 22 is freely rotatable and can be rotated when tension on the blade 100 is released.

Once the tensioning mechanism 10 and the proximal pin holder 22 are rotated as necessary, the blade 100 is reattached thereto. When re-mounted onto the pin 24, the height $H_B$ of the blade 100 thus orients in a plane perpendicular to the plane of motion, and flush with the surface of the work piece. Thereafter, the nut 25 is retightened to reapply tension to the blade 100.

One advantage of the tensioning mechanism 10 is that it does not require separation from the hack saw frame 50 in order to rotate it to a different orientation. Another advantage of the tensioning mechanism 10 is that it substantially prevents inadvertent separation from the hack saw frame 50, due to the interference created by both the tensioning member 26 and the mounting pin 24. Thus, during adjustment, rotation, or replacement of the blade 100, the tensioning mechanism 10 remains assembled with the hack saw frame 50. Additionally, during storage of the frame 50, the tensioning mechanism 10 also remains assembled. Yet another advantage of the tensioning mechanism 10 is that the third section 3, must be properly aligned with the slot 20, in order to extend therethrough when applying tension to a mounted blade 100. Thus, the tensioning mechanism 10 also ensures proper alignment of mounted the blade 100.

As may be recognized by those of ordinary skill in the pertinent art based on the teachings herein, numerous changes and modifications may be made to the above-described and other embodiments of the present invention without departing from the scope of the invention as defined in the appended claims. For example, the tensioning mechanism 10 may equally be assembled to the proximal handle 54 of the hack saw frame rather than the distal portion 56. Alternatively, tensioning mechanisms 10 may be assembled to both the proximal and distal portions of the frame. As another example, the blade 100 may be rotated and aligned for reasons other than performing a "flush cut." For example, the blade 100 may define cutting edges along both elongated edges thereof, such that the desired cutting edge can be used by rotating it into the cutting position. One such exemplary hack saw blade is disclosed in blade is disclosed in U.S. patent application Ser. No. 13/799,546, filed Mar. 13, 2013, entitled "Double Sided Hand Hack Saw Blade and Method of Manufacture," which, in turn, claims the benefit of similarly titled U.S. Provisional Patent Application Ser. No. 61/666,724, filed Jun. 29, 2012, which are hereby expressly incorporated by reference in their entireties as part of the present disclosure. Once one cutting edge of the blade has been spent, the tensioning mechanism 10 may be rotated approximately 180° to utilize the opposing cutting edge. Accordingly, this detailed description of embodiments is to be taken in an illustrative, as opposed to a limiting sense.

What is claimed is:

1. A method comprising the steps of:
   engaging a tensioning mechanism for a hack saw blade with a hack saw frame,
   wherein the hack saw frame comprises an elongate upper frame arm, a proximal handle and a distal portion, and the proximal handle and distal portion define respective proximal and distal mounting slots; and
   the tensioning mechanism comprises
      a first portion having a configuration that, with respect to a configuration of one of proximal and distal slots, permits rotation of the tensioning mechanism when the first portion extends through the one of the proximal and distal slots;
      a second portion having a configuration that, with respect to the configuration of the one of the proximal and distal slots, engages into the one of the proximal and distal slots only in select rotational orientations thereof relative to the slot, wherein one of said orientations is angularly separated from another orientation by a substantially set rotational angle of the second portion;
      a blade mounting pin adjacent a first end of the tensioning mechanism and sufficiently projecting from the tensioning mechanism to prevent removal of the tensioning mechanism from the one of the proximal and distal slots in a direction such that the mounting pin end is trailing when the first portion extends through one of the proximal and distal slots; and
      a threaded portion on a second end of the tensioning mechanism opposite from the first end relative to the first and second portions further comprising an annular thread-interrupting channel;
   wherein the engaging step comprises inserting the tensioning mechanism through one of the proximal and distal mounting slots with an end of the tensioning mechanism opposite the mounting pin end; and
   threading a tensioning fastener onto the threaded portion of the tensioning mechanism and placing a thread-interrupting member in the thread-interrupting channel to prevent removal of the tensioning fastener.

2. A method as defined in claim 1, further comprising the steps of:
   sliding the tensioning mechanism within the slot into a first position wherein the first portion is located in the mounting slot and the second portion is not located in the mounting slot;
   rotating the tensioning mechanism to a first desired select rotational orientation;
   sliding the tensioning mechanism within the slot into a second position wherein at least a portion of the second portion is located in the mounting slot; and
   securing one end of a hack saw blade to the tensioning mechanism.

3. A method as defined in claim 2, further comprising the steps of:
   engaging a blade mounting pin holder into the other of the proximal and distal mounting slot;
   securing the other end of the hack saw blade to the pin holder; and
   applying tension to the hack saw blade by further threading the tensioning fastener onto the threaded portion.

4. A method as defined in claim 3, further comprising the steps of:
   releasing the tension applied to the hack saw blade by partially unthreading the tensioning fastener;
   removing at least one end of the hack saw blade from the hack saw;
   sliding the tensioning mechanism within the slot into the first position;
   rotating the tensioning mechanism to a second desired select rotational orientation;
   sliding the tensioning mechanism within the slot into the second position without separating the tensioning mechanism from the slot;
   reattaching the at least one end of the hack saw blade to the hack saw; and
   re-applying tension to the hack saw blade by re-threading the tensioning fastener onto the threaded portion.

5. A device comprising:
   a tensioning mechanism for a hack saw blade, configured to be extendable through a pin holder mounting slot of a hack saw frame and adapted to apply tension to a hack saw blade attached thereto, the tensioning mechanism comprising:
      a threaded portion and a tensioning fastener threaded thereon, the threaded portion including an annular thread-interrupting channel that interrupts the threads;
      a first portion having a configuration that, with respect to a configuration of the slot, permits rotation of the tensioning mechanism when the first portion extends through said mounting slot,
      a second portion having a configuration that, with respect to the configuration of the slot, engages into the slot only in select rotational orientations thereof relative to the slot, wherein one of said orientations is angularly separated from another orientation by a substantially set rotational angle of the second portion;
      a first mechanism configured to prevent removal of the tensioning mechanism from the mounting slot in a distal direction; and
      a second mechanism configured to prevent removal of the tensioning mechanism from the mounting slot in a proximal direction;
   wherein the tensioning mechanism is slidable within the mounting slot between a first position wherein the first portion is located in the mounting slot and the second portion is not located in the mounting slot, thereby permitting said rotation of the tensioning mechanism, and a second position wherein at least a portion of the second portion is located in the mounting slot; and a thread-interrupting member mounted in the thread-interrupting channel so as to substantially prevent the tensioning fastener from separating from the tensioning mechanism.

6. A device as defined in claim 5, wherein the first mechanism comprises a mounting pin projecting from the tensioning mechanism, configured to interfere with a portion of the hack saw frame surrounding the mounting slot.

7. A device as defined in claim 5, wherein the first mechanism defines a dimension thereof that is greater than a largest dimension of the mounting slot.

8. A device as defined in claim 5, wherein the thread-interrupting member is a snap ring.

9. A device as defined in claim 1, wherein the tensioning fastener includes a fastening nut.

10. A device as defined in claim 5, wherein the tensioning mechanism includes first, second, third and fourth elongate and adjacent sections, wherein
the first section comprises the first mechanism and defines a proximal end of the tensioning mechanism,
the second section comprises the first portion,
the third section comprises the second portion, and
the fourth section comprises the second mechanism and defines a distal end of the tensioning mechanism.

11. A device as defined in claim 5, wherein the first portion is shaped and dimensioned, with respect to the shape and dimensions of the mounting slot, to permit rotation of the tensioning mechanism when the first portion extends through the mounting slot.

12. A device as defined in claim 5, wherein a largest dimension of the first portion transversely to a direction of movement of the tensioning mechanism between the first and second positions is smaller than a smallest dimension of the slot transversely to said direction.

13. A device as defined in claim 5, wherein the second portion is shaped and dimensioned, with respect to the shape and dimensions of the mounting slot, to engage into the mounting slot only in the select rotational orientations thereof relative to the slot.

14. A device as defined in claim 5, wherein at least one of the select rotational orientations is angularly separated from an adjacent select rotational orientation by an approximately 90 degree rotational angle of the second portion.

15. A device as defined claim 5, wherein the second portion is shaped and dimensioned, relative to the shape and dimensions of the mounting slot, to create an interference with a portion of the hack saw frame surrounding the slot when not oriented in one of the select rotational orientations relative to the slot, thereby preventing engagement of the second portion into the slot.

16. A device as defined in claim 5, wherein the second portion is shaped and dimensioned, relative to the shape and dimensions of the mounting slot, to substantially prevent rotation of the tensioning mechanism when the second portion is engaged in the mounting slot.

17. A device as defined in claim 5, wherein the first portion is substantially cylindrical and the second portion is substantially rectangular.

18. A device as defined in claim 5, further comprising a hack saw frame having an elongate upper frame arm, a proximal handle, and a distal portion, wherein one of the proximal handle and distal portion defines the pin holder mounting slot and the other of proximal and distal portions define a second pin holder mounting slot.

19. A device as defined in claim 18, wherein the tensioning mechanism is extendable through at least one of the pin holder mounting slot and the second pin holder mounting slot.

20. A device as defined in claim 18, further comprising a hack saw blade mounted to the hack saw frame.

21. A device comprising:
a tensioning mechanism for a hack saw blade configured to be extendable through a pin holder mounting slot of a hack saw frame and adapted to apply tension to a hack saw blade attached thereto, the tensioning mechanism comprising:
a tensioning fastener mounted on the tensioning mechanism and configured to interfere with a portion of the hack saw frame surrounding the mounting slot to prevent removal of the tensioning mechanism from the mounting slot in a proximal direction;
a first means for permitting rotation of the tensioning mechanism when the first means extends through said mounting slot;
a second means for orienting the tensioning mechanism within the mounting slot only in a plurality of select rotational orientations;
a third means for preventing removal of the tensioning mechanism from the mounting slot in a distal direction; and
a fourth means for preventing removal of the tensioning fastener from the tensioning mechanism;
wherein the tensioning mechanism is slidable within the mounting slot between a first position wherein the first means is located in the mounting slot and the second means is not located in the mounting slot, thereby permitting said rotation of the tensioning mechanism, and a second position wherein at least a portion of the second means is located in the mounting slot.

22. A device as defined in claim 21, wherein
the first means is a first portion of the tensioning mechanism, shaped and dimensioned, with respect to the shape and dimensions of the mounting slot, to permit rotation of the tensioning mechanism when the first portion extends through the mounting slot;
the second means is a second portion of the tensioning mechanism, shaped and dimensioned, with respect to the shape and dimensions of the mounting slot, to engage into the mounting slot only in select rotational orientations thereof relative to the slot, wherein one of said orientations is angularly separated from another orientation by a substantially set rotational angle of the second portion;
the third means is a mounting pin projecting from the tensioning mechanism configured to interfere with a portion of the hack saw frame surrounding the mounting slot; and
the fourth means is a snap ring configured to fit in a thread-interrupting channel of a third portion of the tensioning mechanism.

* * * * *